UNITED STATES PATENT OFFICE.

JOHN CARNRICK, OF BAYONNE, NEW JERSEY.

IMPROVEMENT IN MEDICAL COMPOUNDS.

Specification forming part of Letters Patent No. 152,327, dated June 23, 1874; application filed February 26, 1874.

*To all whom it may concern:*

Be it known that I, JOHN CARNRICK, of Bayonne, in the county of Hudson and State of New Jersey, have invented a new and useful Medical Compound; and I do hereby declare that the following specification is a full, clear, and exact description thereof, which will enable others skilled in the art to make and use the same.

The nature of my newly-invented compound is such as to act as an assistant to the digestive organs of the human body, readily dissolving the various kinds of food taken within the stomach, without the slightest injury to the system. Taken internally, it dissipates itself among the food and acts as a powerful digestive agent, and in a perfectly natural manner, making it an invaluable remedy for patients who are troubled with indigestion, which is the cause of so many diseases, general debility, &c.; and it relates to the employment of certain ingredients combined, which may be used in various forms.

Said compound consists of pepsin, ptyaline, (or diastase,) pancreatine, (or pancreatic fluid,) lactic and sometimes hydrochloric acid. These combined form a compound which I term and is known by the name of "Lactopeptine."

Pepsin is an article of commerce too well known to need description here, although the article forms one of the principal ingredients of my compound.

Ptyaline, or diastase, is prepared as follows: Take one hundred pounds of ground malt, and add to it sufficient warm water to mix well, which causes the diastase to dissolve. The solution is then squeezed out of the malt and heated to a temperature of 170° Fahrenheit, filtered from coagulated albumen, and mixed with absolute alcohol, which precipitates the diastase, or ptyaline, in white flakes.

Pancreatine, or pancreatic fluid, is prepared thus: Take one thousand sweet-breads, or pancreas, and digest them in ten gallons of water at a temperature of about 110° for about fifty minutes, or until the pancreatic juice is taken up by the water. Then evaporate the solution at a temperature of about 110°. The residue will be pure pancreatine, except a minute proportion of salts of soda and potash.

Lactic and hydrochloric acids, other well-known articles of commerce, may be found at most of the medical laboratories.

The five ingredients aforesaid comprise the principal active agents of digestion, as they exist in a healthy human system, having all the important advantages of dissolving all aliment that is used as food by mankind.

Thus pepsin, in the gastric juices, is important, as it, in conjunction with other matters in that secretion, has the power to dissolve all kinds of plastic food.

Ptyaline acts powerfully upon vegetable matter, separating and dissolving the nutritious portions.

Pancreatine acts upon fatty substances, emulsionizing and preparing such matter for assimilation.

Lactic and hydrochloric acids are found in the gastric juice as important agents, acting with the other matters. Their importance is obvious, as in the absence of these acids pepsin will not change the character of the food when in contact.

In the preparation of my compound I add to six drams of powdered sugar of milk one dram of pepsin, nineteen-twentieths dram of pancreatine, one-twentieth dram ptyaline, and ten drops of lactic acid, and ten drops of hydrochloric acid. The latter, however, may be dispensed with. This will be in form of a liquid.

The same compound may be formed into powders by placing the same in a drying-oven heated to a temperature of about 100°, more or less, until the water of the solution is evaporated. Thus, it may be formed into fluids, powders, pills, troches, &c., which may be mixed with various other properties, as wines, cordials, extracts, oils, medicine, food, &c. For a dose, two to five grains will be generally sufficient to aid digestion in a natural way, although the dose may be varied without harm to the patient.

Its object becomes apparent to all skilled in the art. Being a compound the component parts of which are the same as exist in the human system, and as every person does not possess the proper proportions essential to produce proper digestion, it supplies a want long felt. Thus an artificial remedy is prepared which is in accordance with nature, perfectly free from any bad effects upon the system, and such as can be taken by a child without the slightest harm arising from it. The various forms in which it may be prepared renders it an easy remedy to be taken by any person, in whatever state of sickness they may be in.

Having thus set forth my newly-invented compound, what I claim as new, and desire to secure Letters Patent of the United States for, is—

A medical compound composed of pepsin, pancreatine, ptyaline, and lactic or hydrochloric acids, either one or both of the latter, in the manner and for the purposes set forth.

JOHN CARNRICK.

Witnesses:
JOHN DANE, Jr.,
M. M. COOKE.